July 24, 1928.
J. L. PAYTON
1,678,575
CHAIN FASTENER
Filed Sept. 3, 1927
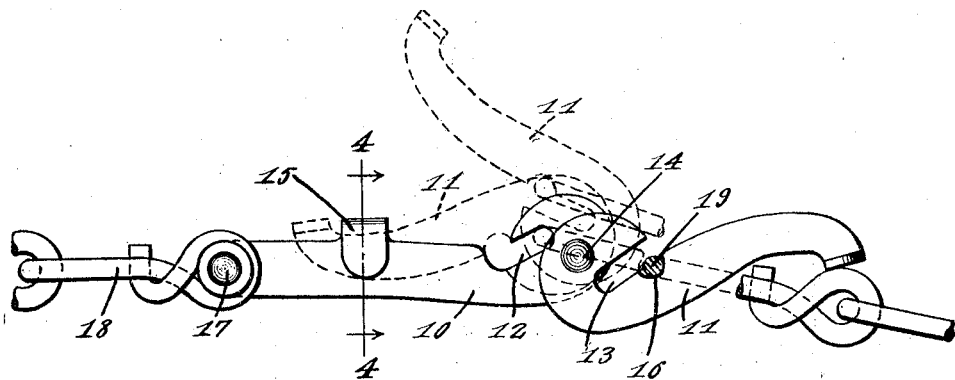
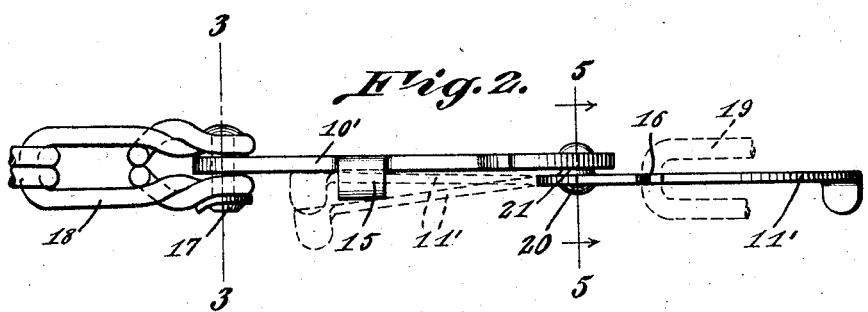
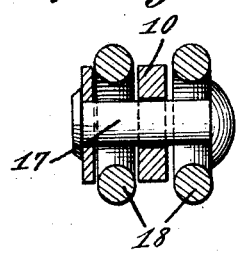 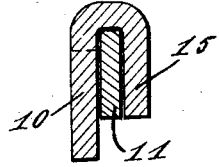 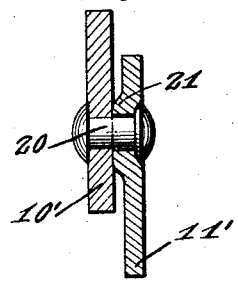
J. L. Payton, INVENTOR
BY Victor J. Evans
ATTORNEY Patented July 24, 1928.

1,678,575

UNITED STATES PATENT OFFICE.

JAMES L. PAYTON, OF JEFFERSON CITY, MISSOURI.

CHAIN FASTENER.

Application filed September 3, 1927. Serial No. 217,390.

This invention relates to automobile tire chain fasteners, and contemplates a structure including pivotally associated hook-like sections designed to receive the adjacent link of the chain, and hold the latter against casual separation from the fastener when the two sections are latched together.

In carrying out the invention I comprehend a fastener of the class in question including two pivotally connected hook-like sections, one of which is provided with a notch to receive the adjacent link of the chain while the respective sections of the fastener are being latched or unlatched, the said link being received by the slots or bills of the hooks after said sections have been connected together, thereby holding the chain against separation from the fastener.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a side elevation of the fastener forming the subject matter of the present invention, showing the opened position of the fastener by full lines and different closed positions by dotted lines.

Figure 2 is an edge elevation of a slightly modified construction.

Figure 3 is a sectional view on line 3—3 of Figure 2.

Figure 4 is a sectional view on line 4—4 of Figure 1.

Figure 5 is a sectional view on line 5—5 of Figure 2.

Referring to the drawing in detail 10 and 11 indicate respectively the two hook-like sections of the fastener, the former being provided with a slot 12 and the latter with a similar slot 13. These two sections are pivotally connected together as at 14, the section 11 being adapted to be swung upon said pivot to either open or close the fastener as the occasion may require. Carried by the section 10 is a substantially U-shaped clip adapted to receive the section 11 to hold the fastener closed as will be readily understood. The section 11 is provided with a notch 16 immediately adjacent its slot 13, and the purpose of said notch will be presently described. The section 10 is provided with an opening to accommodate a rivet 17, and one end of the chain 18 is coiled about the rivet as clearly illustrated in Figures 2 and 3.

In practice the link 19 constituting the free end of the chain is slipped over the section 11 of the fastener when the section occupies its open position illustrated in Figure 1, and the link is initially arranged in the notch 16. The section 11 is then swung upon its pivot in the direction of the section 10, and ultimately arranged at one side of said section as illustrated by dotted lines in Figure 1. During this movement of the section 11, the notch 16 acts as a guide, holding the link 19 clear of the section 10 until the section 11 is arranged in its final position in engagement with the clip 15. The link 19 is then permitted to slip back into the slots 12 and 13 respectively, and is locked in this position, so that the chain can not become casually separated under any circumstances. It is to be borne in mind that the link and slots are of such size, that the link fits snugly within the slots, and thereby prohibits the section 11 from being lowered out of engagement from the clip 15. In other words the link can not be removed from the fastener until it is again moved forwardly and positioned in the notch 16, as the section 11 can not move upon its pivot unless the link 19 is located in said notch.

In Figures 2 and 5 I have illustrated a slightly modified construction, wherein the sections 10' and 11' are constructed in the same manner as hereinabove described, except that the section 11' is provided with an opening slightly larger in diameter than the opening in the section 10' for reception of the rivet or pivot 20. The inner side of the section 11' is slightly bulged about said opening as at 21, and is utilized to hold said sections slightly spaced apart, so that they can not become tied together by rust or the like, and thereby always assure proper freedom of movement of the section 11'. By having the openings in the respective sections of slightly different diameters, it is understood that when the two sections are riveted together by a riveting machine or the like, it naturally swells the head of the rivet, causing the same to become tight in the small opening, and at the same time provide sufficient play for the rivet in the large opening. This allows the section 11 to be sprung outwardly, and slip out from under and over the clip 15.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A chain fastener of the character described comprising a pair of hook-like sections pivotally connected together, each of said sections having a slot, one of said sections having a notch communicating with its slot and adapted to initially receive a link of the chain and hold the latter free of the other section, while the first mentioned section is being moved about its pivot to a position at one side of the other section, and subsequently guiding the link into the slots of the respective sections, means for holding said sections side by side, and said link subsequently moving from said notch into the aligned slots of said section.

2. A chain fastener of the character described comprising a pair of hook-like sections pivotally connected together, each section having a slot, one section having a notch communicating with said slot to initially receive a link of the chain and hold the latter free of the other section, while the first mentioned section is being moved about its pivot parallel with the second mentioned section, and subsequently guide the link into the slots of the respective sections, said sections being adapted to be arranged side by side, and a clip carried by one section and adapted to engage the other section to hold said sections side by side in their active positions.

3. A chain fastener of the character described comprising a pair of hook-like sections pivotally connected together, each section having a slot, one section having a notch communicating with said slot to initially receive a link of the chain and hold the latter free of the other section, while the first mentioned section is being moved about its pivot parallel with the second mentioned section, and subsequently guide the link into the slots of the respective sections, a bulged portion formed on one section and surrounding said pivot, and holding said sections slightly spaced apart, and means carried by one section and adapted to engage the other section for holding said sections side by side in their active positions.

In testimony whereof I affix my signature.

JAMES L. PAYTON.